United States Patent
Ohsaki

(10) Patent No.: US 7,316,157 B2
(45) Date of Patent: Jan. 8, 2008

(54) DEVICE AND METHOD FOR ESTIMATING TEMPERATURE OF EXHAUST PIPE OF INTERNAL COMBUSTION ENGINE

(75) Inventor: Satoru Ohsaki, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 11/478,734

(22) Filed: Jul. 3, 2006

(65) Prior Publication Data
US 2007/0000235 A1    Jan. 4, 2007

(30) Foreign Application Priority Data
Jul. 4, 2005    (JP)    ............................... 2005-194964

(51) Int. Cl.
*G01M 15/10*    (2006.01)
(52) U.S. Cl. .................................................... 73/118.1
(58) Field of Classification Search ............... 73/23.31, 73/23.32, 116, 117.2, 117.3, 118.1
See application file for complete search history.

(56) References Cited

U.S. PATENT DOCUMENTS

| | | | |
|---|---|---|---|
| 5,956,941 A | * | 9/1999 | Cullen et al. .................. 60/274 |
| 6,739,184 B2 | * | 5/2004 | Brazeau et al. ............ 73/118.1 |
| 2004/0230366 A1 | * | 11/2004 | Ueda et al. .................. 701/108 |

FOREIGN PATENT DOCUMENTS

JP    2002-48749    2/2002

* cited by examiner

*Primary Examiner*—Eric S. McCall
(74) *Attorney, Agent, or Firm*—Nixon & Vanderhye P.C.

(57) ABSTRACT

A device for estimating a temperature of an exhaust pipe of an engine includes: a first obtaining section for obtaining a first heat amount that the exhaust pipe receives per unit time from exhaust gas of the internal combustion engine; a second obtaining section for obtaining a second heat amount that the exhaust pipe releases per the unit time to external air; and a temperature estimater estimating the temperature of the exhaust pipe based on the obtained first amount and the obtained second amount. The first obtaining section obtains the first amount based on an exhaust gas speed related value related to a speed of a flow of the exhaust gas.

24 Claims, 6 Drawing Sheets

DEVICE AND METHOD FOR ESTIMATING TEMPERATURE OF EXHAUST PIPE OF INTERNAL COMBUSTION ENGINE

CROSS REFERENCE TO RELATED APPLICATION

This application is based on and incorporates herein by reference Japanese patent application No. 2005-194964 filed on Jul. 4, 2005.

FIELD OF THE INVENTION

The present invention relates to a device and a method for estimating a temperature of an exhaust pipe of an internal combustion engine.

BACKGROUND OF THE INVENTION

In general, an exhaust gas in an internal combustion engine includes air vapor which is produced through combustion reaction of fuel and inhaled air. The air vapor is condensed to become condensed water when the exhaust gas is cooled down in an exhaust pipe. However, an oxygen sensor located at the exhaust pipe may crack when the condensed water is attached to the oxygen sensor which has been heated by a heater.

In JP-2002-48749A, a device is disclosed which estimates a temperature of the exhaust pipe based on an amount of heat received by the exhaust pipe from the exhaust gas and an amount of heat released by the exhaust pipe to the external air. The device activates the heater for the oxygen sensor when the estimated temperature of the exhaust pipe reaches a temperature at which the condensed water is not generated in the exhaust pipe.

When flow speed or density of the exhaust gas changes caused by change of an operation status of the internal combustion engine, an amount of the heat received per a unit time by the exhaust pipe from the exhaust gas also changes and the temperature of the exhaust pipe accordingly changes. However, the device disclosed in JP-2002-48749A does not take the flow speed or the density of the exhaust gas into account in calculating the temperature of the exhaust pipe. The device disclosed in JP-2002-48749A cannot estimate the amount of the heat received by the exhaust pipe with a high degree of accuracy and therefore cannot estimate the temperature of the exhaust pipe with a high degree of accuracy.

SUMMARY OF THE INVENTION

It is therefore an object of the present invention to provide a device and a method for estimating a temperature of an exhaust pipe of an internal combustion engine, which can estimate the temperature of the exhaust pipe with a high degree of accuracy.

In a first aspect of the present invention, a device for estimating a temperature of an exhaust pipe of an internal combustion engine having an exhaust pipe includes: a first obtaining means for obtaining a first heat amount received per unit time by the exhaust pipe from exhaust gas of the internal combustion engine; a second obtaining means for obtaining a second heat amount released per the time by the exhaust pipe to external air; and a temperature estimation means for estimating the temperature of the exhaust pipe based on the obtained first amount and the obtained second amount, wherein the first obtaining means obtains the first amount based on a exhaust gas speed related value related to a speed of a flow of the exhaust gas.

According to the first aspect of the present invention, it is possible to obtain with a high degree of accuracy the amount of the heat received by the exhaust pipe, in response to a situation in which the amount of the heat transferred per unit time from the exhaust gas to the exhaust pipe changes in accordance with the speed of the flow of the exhaust gas. The temperature of the exhaust pipe is accordingly estimated with a high degree of accuracy based on the amount of the heat received by the exhaust pipe.

In the second aspect of the present invention, the first obtaining means obtains the first amount based on an exhaust gas density related value related to a density of the exhaust gas. According to the first aspect of the present invention, it is possible to obtain with a high degree of accuracy the amount of the heat received by the exhaust pipe, in response to a situation in which the amount of the heat transferred per unit time from the exhaust gas to the exhaust pipe changes in accordance with the density of the exhaust gas. The temperature of the exhaust pipe is accordingly estimated with a high degree of accuracy based on the amount of the heat received by the exhaust pipe.

In the third aspect of the present invention, a device for estimating a temperature of an exhaust pipe of an internal combustion engine having an exhaust pipe includes: a first obtaining means for repeatedly obtaining a first heat amount received per unit time by the exhaust pipe from exhaust gas of the internal combustion engine; a second obtaining means for repeatedly obtaining a second heat amount released per the time by the exhaust pipe to external air; and a temperature estimation means for repeatedly estimating the temperature of the exhaust pipe, by estimating, based on the obtained first amount and the obtained second amount, a change of the temperature of the exhaust pipe per the time and by adding in series the change to an initial value for the temperature of the exhaust pipe.

In this case, the temperature estimation means uses, as the initial value, an estimated value for the temperature of the exhaust pipe in starting the engine, the estimated value being estimated based on a temperature of the external air, another estimated value for the temperature of the exhaust pipe and a duration within which the internal combustion engine is kept stopped, the another estimated value being estimated before the internal combustion engine lastly stops.

When the internal combustion engine is stopped, the temperature of the exhaust pipe gradually decreases from a value of the temperature of the exhaust pipe temperature just before the internal combustion engine is stopped. It is therefore possible to estimate the estimated value for the temperature of the exhaust pipe in starting the internal combustion engine, by means of the temperature of the external air, another estimated value for the temperature of the exhaust pipe and a duration within which the internal combustion engine is kept stopped. By using the estimated value for the temperature of the exhaust pipe as the initial value for the temperature of the exhaust pipe, it is possible to estimate with a high degree of accuracy the temperature of the exhaust pipe even after a time when the internal combustion engine is started again before the temperature of the exhaust pipe decreases to the temperature of the external air.

In the fourth aspect, a device for estimating a temperature of an exhaust pipe of an internal combustion engine having an exhaust pipe includes: a first obtaining means for obtaining a first heat amount received per unit time by the exhaust pipe from exhaust gas of the internal combustion engine; a second obtaining means for obtaining a second heat amount released per the time by the exhaust pipe to external air; and a third obtaining means for obtaining a third amount of condensed water generated in the exhaust pipe; a fourth obtaining means for obtaining, based on the obtained third amount, a fourth amount of heat received by the condensed water; and a temperature estimation means for estimating the temperature of the exhaust pipe based on the obtained first amount, the obtained second amount and the obtained fourth amount. It is therefore possible to estimate the temperature of the exhaust pipe in response to the amount of the heat received by the condensed water.

In the fifth aspect of the present invention, a method for estimating a temperature of an exhaust pipe of an internal combustion engine having an exhaust pipe includes: obtaining a first heat amount received per unit time by the exhaust pipe from exhaust gas of the internal combustion engine; obtaining a second heat amount released per the time by the exhaust pipe to external air; and estimating the temperature of the exhaust pipe based on the obtained first amount and the obtained second amount. In this case, the first amount is obtained based on an exhaust gas speed related value related to a speed of a flow of the exhaust gas.

In the sixth aspect of the present invention, a method for estimating a temperature of an exhaust pipe of an internal combustion engine having an exhaust pipe includes: obtaining means for obtaining a first heat amount received per unit time by the exhaust pipe from exhaust gas of the internal combustion engine; obtaining means for obtaining a second heat amount released per the time by the exhaust pipe to external air; and estimating the temperature of the exhaust pipe based on the obtained first amount and the obtained second amount. In this case, the first amount is obtained based on an exhaust gas density related value related to a density of the exhaust gas.

In the seventh aspect of the present invention, a method for estimating a temperature of an exhaust pipe of an internal combustion engine having an exhaust pipe includes: repeatedly obtaining a first heat amount received per unit time by the exhaust pipe from exhaust gas of the internal combustion engine; repeatedly obtaining a second heat amount released per the time by the exhaust pipe to external air; and repeatedly estimating the temperature of the exhaust pipe, by estimating, based on the obtained first amount and the obtained second amount, a change of the temperature of the exhaust pipe per the time and by adding in series the change to an initial value for the temperature of the exhaust pipe. In this case, an estimated value for the temperature of the exhaust pipe in starting the engine is used as the initial value, the estimated value being estimated based on a temperature of the external air, another estimated value for the temperature of the exhaust pipe and a duration within which the internal combustion engine is kept stopped, the another estimated value being estimated before the internal combustion engine lastly stops.

In the eighth aspect of the present invention, a method for estimating a temperature of an exhaust pipe of an internal combustion engine having an exhaust pipe includes: obtaining a first heat amount received per unit time by the exhaust pipe from exhaust gas of the internal combustion engine; obtaining a second heat amount released per the time by the exhaust pipe to external air; obtaining a third amount of condensed water generated in the exhaust pipe; obtaining, based on the obtained third amount, a fourth amount of heat received by the condensed water; and estimating the temperature of the exhaust pipe based on the obtained first amount, the obtained second amount and the obtained fourth amount.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
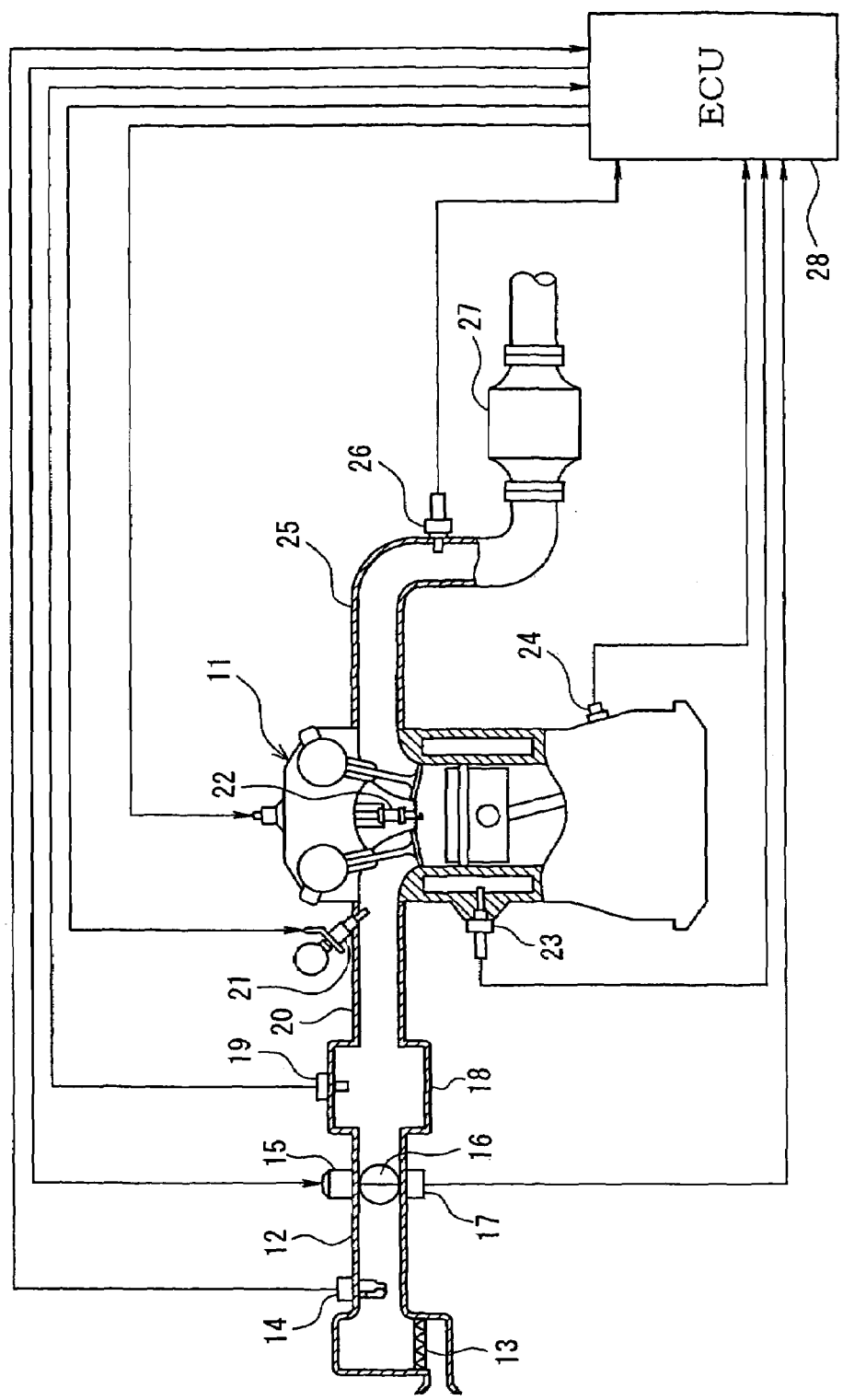
FIG. 1 is a schematic view of an engine control system according to the first embodiment of the present invention.

Hereafter, the first embodiment of the present invention is described with reference to FIGS. 1 to 7. In an engine control system for a vehicle according to an embodiment of the present invention includes, as schematically shown in FIG. 1, an engine 11, an intake pipe 12, an air cleaner 13, an air flow meter 14, a motor 15, a throttle valve 16, a throttle position sensor 17, a surge tank 18, an intake pipe pressure sensor 19, an intake manifold 20, fuel injection valves 21, spark plugs 22, cooling water sensors 23, crank angle sensors 24, an exhaust pipe 25, an oxygen sensor 26, a catalyst 27, and an engine control unit (hereafter referred to as an ECU) 28.

The air cleaner 13 is located at an upstream end of the intake pipe 12 for the internal combustion engine 11. The air flow meter 14 is located at a place downstream of the air flow meter 14. The motor 15, the throttle valve 16 and the throttle position sensor 17 are located downstream of the air flow meter 14. A degree of opening of the throttle valve 16 is controlled by the motor 15 and detected by the throttle position sensor 17. Hereafter, the degree of opening of the throttle valve 16 is referred to as an opening degree.

The surge tank 18 is located at a place downstream of the throttle valve 16. The intake pipe pressure sensor 19 is installed to the surge tank 18 and detects a pressure in the intake pipe 12. The intake manifold 20 is also installed to the surge tank 18 which guides air to each of cylinders of the engine 11. The intake manifold 20 includes intake ports for the respective cylinders. The fuel injection valves 21 are installed at places close to the respective intake ports and inject fuel. The spark plugs 22 are located at respective cylinder heads of the cylinders. The spark plugs 22 sparks to ignite air fuel mixture in the respective cylinders.

The oxygen sensor 26 is located at the exhaust pipe 25 of the engine 11 and heated by a heater to detect richness or leanness of exhaust gas in the exhaust pipe 25. The catalyst 27 is located at a place downstream of the oxygen sensor 26 and purifies the exhaust gas. The catalyst 27 may be a three-way catalyst.

The cooling water sensors 23 and the crank angle sensors 24 are installed to respective cylinder blocks of the cylinders. Each of the cooling water sensors 23 detects a temperature of cooling water for a corresponding cylinder. Each of the crank angle sensors 24 outputs a pulse signal every time when a crankshaft for a corresponding cylinder is rotated by a predetermined crank angle. Current crank angles of the cylinders and a rotational speed of the engine 11 can be detected based on the pulse signals outputted by the crank angle sensors 24.

Outputs of the sensors described above are inputted to the ECU 28. The ECU 28 includes a microcomputer and executes, by using a CPU and a RAM of the microcomputer, several types of engine control programs stored in a ROM (a storage device) of the microcomputer to control, based on a status of an operation of the engine 11, amounts of fuel to be injected by the fuel injection valves 21 and timings of ignition for the spark plugs 22.

The ECU 28 estimates a temperature (hereafter referred to as an exhaust pipe temperature Tp) of the exhaust pipe 25 by executing programs (described in detail later) shown in FIGS. 6 and 7 after an IG switch (not shown) is turned on. The exhaust pipe temperature Tp may be, for example, a temperature of a portion of the exhaust-pipe 25 close to the oxygen sensor 26. Hereafter, a method for estimating the exhaust pipe temperature Tp is described in detail with reference to FIGS. 2 to 4.

Figure 2:
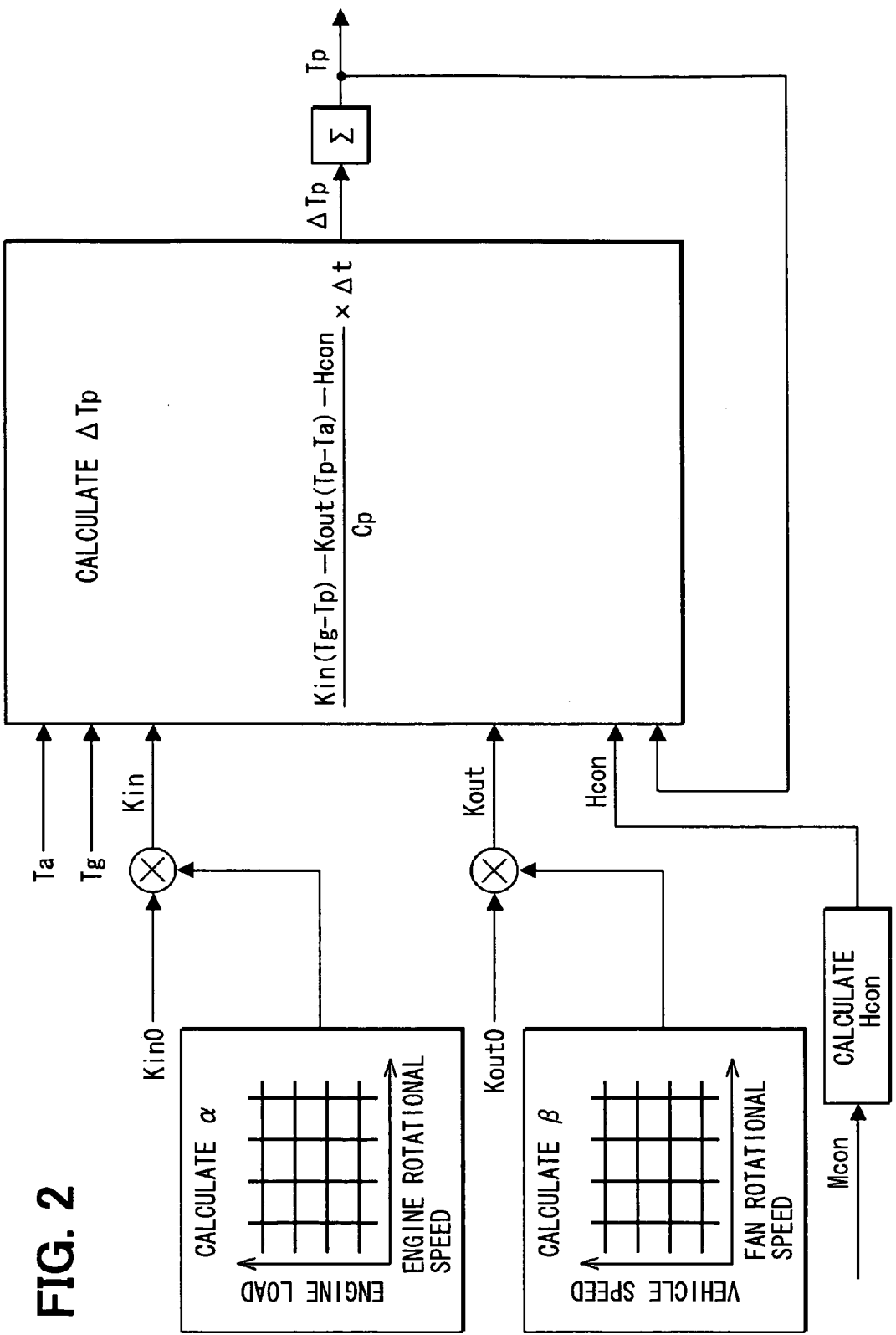
FIG. 2 is a block diagram showing a method for estimating a temperature of an exhaust pipe while an engine is working.
Figure 3:
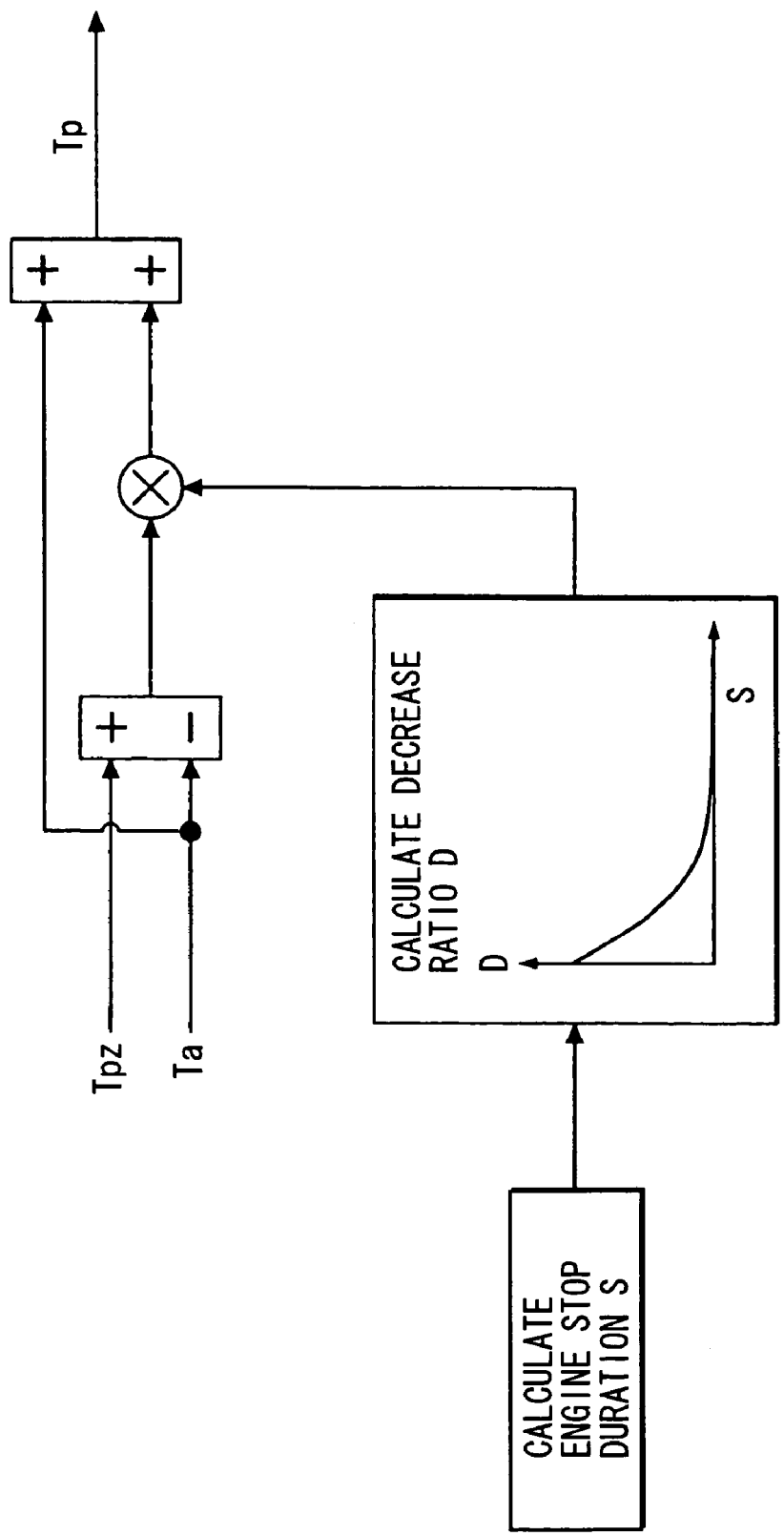
FIG. 3 is a block diagram showing a method for estimating the temperature of the exhaust pipe while the engine is not working.
Figure 4:
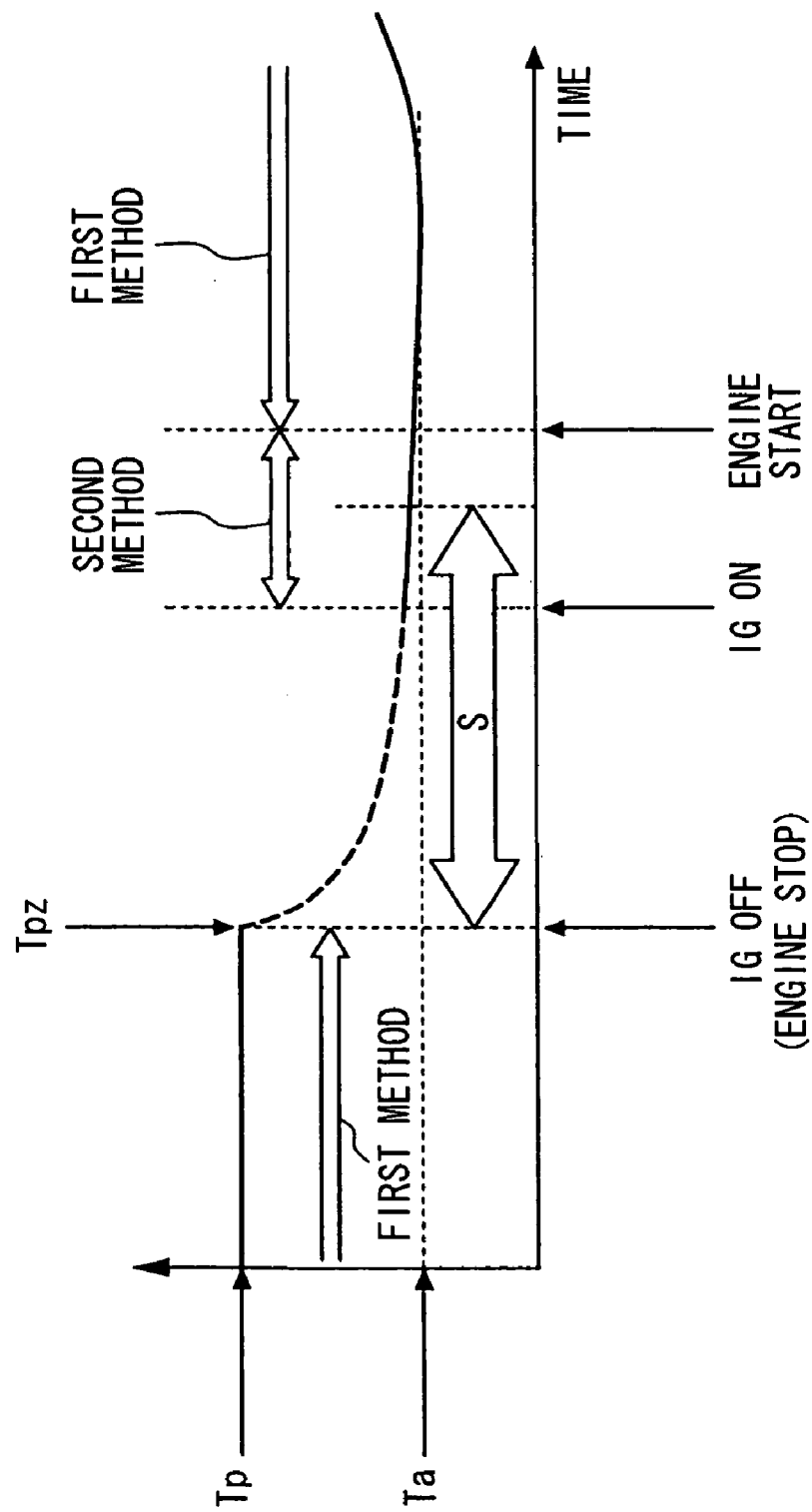
FIG. 4 is a timing chart showing the methods for estimating the temperature of the exhaust pipe while the engine is working or not working.

As shown in a timing chart in FIG. 4, the ECU 28 estimates the exhaust pipe temperature Tp by using the first method shown in FIG. 2 while the engine 11 is running, that is, in a period from a time when the engine 11 is started to a time when the IG switch is tuned off. The ECU 28 also estimates the exhaust pipe temperature Tp by using the second method shown in FIG. 3 while the engine 11 is not running (more specifically, in a period S from a time when the IG switch is turned on to a time when the engine 11 is started).

As shown in FIG. 2, in the first method for estimating the exhaust pipe temperature Tp, the ECU 28 calculates a coefficient (hereafter referred to an incoming heat transfer coefficient) Kin for heat transfer from the exhaust gas to the exhaust pipe 25 and a coefficient (hereafter referred to an outgoing heat transfer coefficient) Kout for heat transfer from the exhaust pipe 25 to the external air.

In calculating the incoming heat transfer coefficient Kin, the ECU 28 calculates a correction coefficient α corresponding to a current rotational speed of the engine 11 and current load on the engine 11, by using a data map mapping pairs of a value for the load and a value for the current rotational speed to respective values for the correction coefficient α. In the calculation, the current engine rotational speed serves as information indirectly indicating a speed of a flow of the exhaust gas in the exhaust pipe 25. In addition, the load of the engine 11 serves as information indirectly indicating a density of the exhaust gas in the exhaust pipe 25. The load of the engine 11 may be detected as a pressure on the intake pipe 12 or an amount of air in the cylinders of the engine 11.

The correction coefficient α is a constant number used for correcting an initial value (hereafter referred to as an initial incoming heat transfer coefficient) KinO for the incoming heat transfer coefficient Kin.

More specifically, the incoming heat transfer coefficient Kin is obtained by multiplying the initial incoming heat transfer coefficient Kin0 by the correction coefficient α.

$$Kin = Kin0 \times \alpha$$

The data map for the correction coefficient α may be stored in the ROM of the ECU 28 and may be composed based on experimental data or design data indicating a relation among the engine rotational speed, the engine load and an amount of heat received by the exhaust pipe 25. The amount of the heat received per a unit time by the exhaust pipe 25 generally increases as the engine rotational speed increases, that is, as the speed of the flow of the exhaust gas increases. The amount of the heat received per a unit time by the exhaust pipe 25 also generally increases as the engine load increases, that is, as the speed of the density of the exhaust gas increases. Therefore, the correction coefficient α increases as the engine rotational speed or the engine load increases in the data map for the correction coefficient α. Accordingly, the incoming heat transfer coefficient Kin increases as the engine rotational speed or the engine load increases.

In calculating the outgoing heat transfer coefficient Kout, the ECU 28 calculates a correction coefficient β corresponding to a rotational speed of a radiator fan and a speed of the vehicle, by using a data map mapping pairs of a value for the rotational speed of the radiator fan and the speed of the vehicle to respective values for the correction coefficient β. In the calculation, the rotational speed of the radiator fan and the speed of the vehicle serve as information indirectly indicating a speed of a flow of the external air.

The correction coefficient β is a multiplier used for correcting an initial value (hereafter referred to as an initial outgoing heat transfer coefficient) Kout0 for the outgoing heat transfer coefficient Kout.

More specifically, the outgoing heat transfer coefficient Kout is obtained by multiplying the initial outgoing heat transfer coefficient Kout0 by the correction coefficient β.

$$Kout = Kout0 \times \beta$$

The data map for the correction coefficient β may be stored in the ROM of the ECU 28 and may be composed based on experimental data or design data indicating a relation among the rotational speed of the radiator fan, the speed of the vehicle and an amount of heat released by the exhaust pipe 25. The amount of the heat released per a unit time by the exhaust pipe 25 generally increases as the rotational speed of the radiator fan or the speed of the vehicle increases, that is, as the speed of the flow of the external air increases. Therefore, the correction coefficient β increases as the rotational speed of the radiator fan or the speed of the vehicle increases in the data map for the correction coefficient β. Accordingly, the outgoing heat transfer coefficient Kout increases as the rotational speed of the radiator fan or the speed of the vehicle increases.

The ECU 28 further estimates an amount Mcon of condensed water in the exhaust pipe 25 in a method described later. Then the ECU 28 calculates, based on the estimated amount Mcon of the condensed water, an amount (hereafter referred to as a condensed water heat absorption) Hcon of heat transferred per a calculation period Δt from the exhaust pipe 25 and the exhaust gas to the condensed water. The calculation period Δt is a time interval between two subsequent calculations for the exhaust pipe temperature Tp made by the ECU 28. The ECU 28 serves as a condensed water heat absorption calculation means by executing the calculation.

After calculating the incoming heat transfer coefficient Kin, outgoing heat transfer coefficient Kout and the condensed water heat absorption Hcon, the ECU 28 calculates an amount of heat received per the calculation period Δt by the exhaust pipe 25. The amount of the heat received per the calculation period Δt by the exhaust pipe 25 is calculated by multiplying, by the incoming heat transfer coefficient Kin, a difference between a temperature (hereafter referred to as an exhaust gas temperature) Tg of the exhaust gas and the exhaust pipe temperature Tp. Thus, the amount of the heat received per the calculation period Δt by the exhaust pipe 25 is calculated based on the engine rotational speed and the engine load by a mathematical expression {Kin×(Tg−Tp)}.

The ECU 28 further calculates an amount of heat released per the calculation period Δt by the exhaust pipe 25 to the external air. The amount of the heat released per the calculation period Δt by the exhaust pipe 25 is calculated by multiplying, by the outgoing heat transfer coefficient Kout, a difference between the exhaust pipe temperature Tp and a temperature (hereafter referred to as an external air temperature) Ta of the external air. Thus, the amount of the heat released per the calculation period Δt by the exhaust pipe 25 is calculated based on the rotational speed of the radiator fan and the speed of the vehicle by a mathematical expression {Kout×(Tp−Ta)}.

The ECU 28 may estimate the exhaust gas temperature as, for example, a temperature of the exhaust gas at a place close to the oxygen sensor 26, based on a rotational speed of the engine 11 or an amount of the air which is inhaled into the intake pipe 12 and detected by the air flow meter 14. Otherwise, the exhaust gas temperature Tg may be detected by a temperature sensor.

The ECU 28 subsequently calculates an amount (hereafter referred to as an exhaust pipe temperature change amount) ΔTp of change per the calculation period Δt in the exhaust pipe temperature Tp based on the amount {Kin×(Tg−Tp)} of the heat received per the calculation period Δt by the exhaust pipe 25, the amount {Kout×(Tp−Ta)} of the heat released per the calculation period Δt by the exhaust pipe 25, the condensed water heat absorption Hcon, a heat capacity Cp of the exhaust pipe 25, and the calculation period Δt. The calculation is made according to an equation as follows:

$$\Delta Tp = \{Kin \times (Tg-Tp) - Kout \times (Tp-Ta) - Hcon\} \times \Delta t/Cp$$

Subsequently, the ECU 28 calculates the exhaust pipe temperature Tp of the present time of calculation by adding the calculated exhaust pipe temperature change amount ΔTp to the exhaust pipe temperature Tp of the last previous time of calculation. In other words, the ECU 28 calculates the exhaust pipe temperature Tp of the present time by adding to an initial exhaust pipe temperature the calculated exhaust pipe temperature change amounts ΔTp repeatedly calculated until the present time of calculation.

$$Tp = Tp + \Delta Tp$$

The exhaust pipe temperature Tp is stored in a backup RAM of the ECU 28. The backup RAM is a rewritable nonvolatile memory and keeps storing data while the engine is not working and the IG switch is off. At a time instant when the engine 11 is started again, the ECU 28 may estimate the exhaust pipe temperature Tp so that it equals to the exhaust pipe temperature Tp estimated by the second method just before the engine 11 is started.

When the engine 11 is stopped, the exhaust pipe temperature Tp gradually decreases from the exhaust pipe temperature Tp at a time instant just before the engine 11 is stopped. A decrease rate of the exhaust pipe temperature Tp increases as the external air temperature decreases. The exhaust pipe temperature Tp also decreases as the engine 11 is kept stopped for a longer time. The ECU 28 therefore estimates the exhaust pipe temperature Tp in the second method shown in FIG. 3 while the engine 11 is kept stopped. In the second method, the ECU 28 calculates, based on a duration (hereafter referred to as an engine stop duration) S in which the engine 11 is kept stopped, a negative decrease ratio (hereafter referred to as exhaust pipe temperature decrease ratio) D of the exhaust pipe temperature Tp. The calculation is made by using a data map which maps values of engine stop durations S to respective values of the exhaust pipe temperature decrease ratios D. The data map for the exhaust pipe temperature decrease ratio D may be stored in the ROM of the ECU 28 and may be composed based on experimental data or design data indicating a relation among the engine stop duration S and the exhaust pipe temperature decrease ratio D. For example, the exhaust pipe temperature decrease ratio D is determined so that the exhaust pipe temperature Tp converges at the external air temperature Ta according to the first order lag.

The ECU 28 subsequently multiplies, by the exhaust pipe temperature decrease ratio D, a difference between a temperature Tpz of the exhaust pipe 25 at a time instant just before the engine is stopped and the external air temperature Ta. The ECU 28 then adds the multiplied value to the external air temperature Ta to obtain the exhaust pipe temperature Tp.

$$Tp = (Tpz - Ta) \times D + Ta$$

Figure 5:
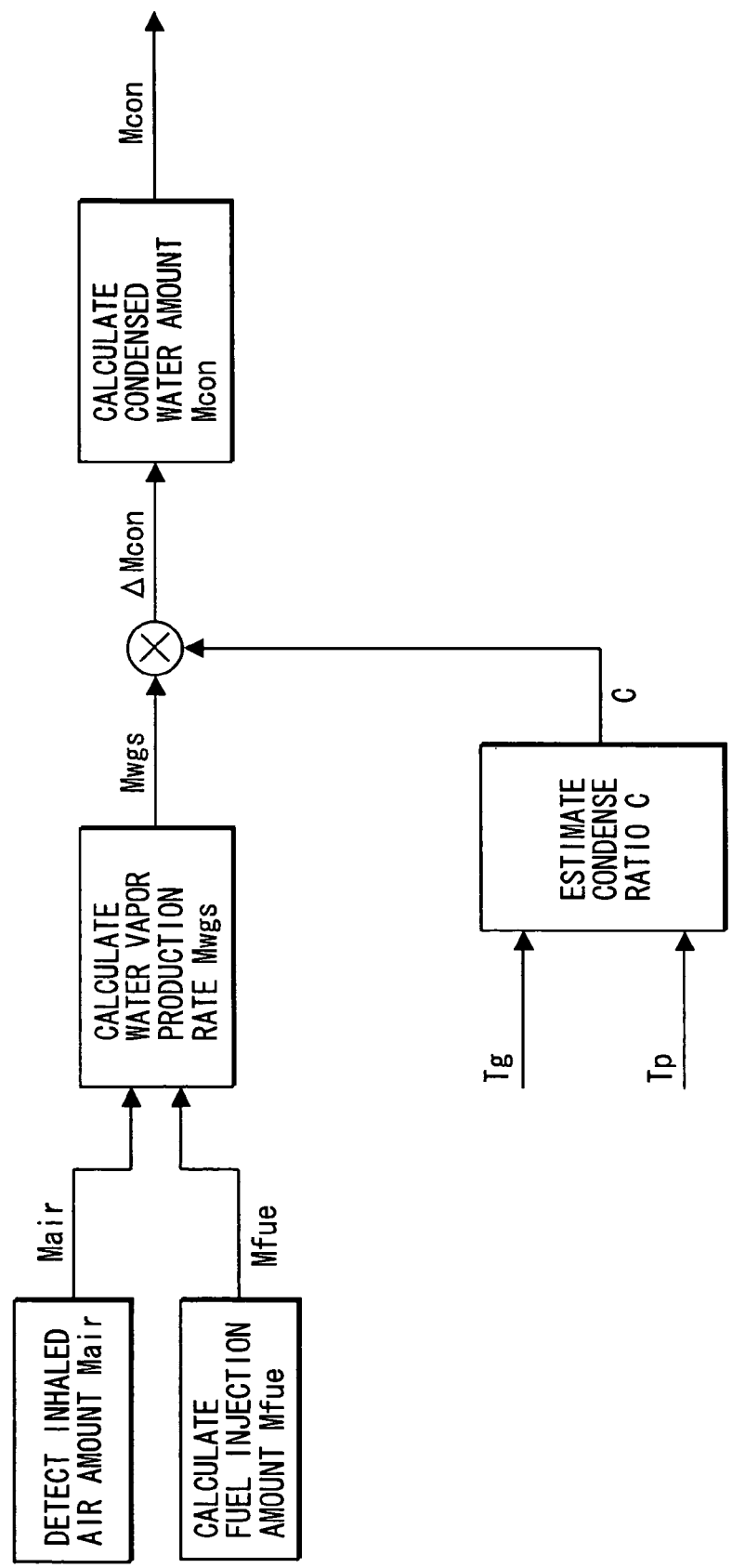
FIG. 5 is a block diagram showing a method for estimating an amount of condensed water.

Next, the method for estimating the amount (hereafter referred to as a condensed water amount) Mcon of the condensed water is described in detail. As shown in FIG. 5, the ECU 28 calculates a production rate (hereafter referred to as a water vapor production rate) Mwgs [g/s] per a unit time of water vapor which is produced through combustion reaction of the fuel and the inhaled air. The water vapor production rate Mwgs is calculated based on an amount Mair [g/s] of the air inhaled per a unit time and an amount Mfue [g/s] of the fuel injected per a unit time.

The ECU 28 also calculates a condense ratio C based on the current exhaust gas temperature Tg and the current exhaust pipe temperature Tp. The calculation is made by using a data map of the condense ratio C in which pairs of a value for the exhaust gas temperature Tg and a value for the exhaust pipe temperature Tp to respective values for condense ratio C are mapped. The condense ratio C is a ratio between the water vapor which condenses in the exhaust pipe 25 and the water vapor produced through combustion reaction of the fuel and the inhaled air. The data map for the condense ratio C may be stored in the ROM of the ECU 28 and may be composed based on experimental data or design data indicating a relation among the exhaust gas temperature Tg, the exhaust pipe temperature Tp and the condense ratio C.

Subsequently, the ECU 28 multiplies the water production rate Mwgs by the condense ratio C and the calculation period Δt to obtain an increase amount ΔMcon [g] of the condensed water per the calculation period. The calculation period Δt is a time interval between two subsequent calculations for the condensed water amount Mcon.

$$\Delta Mcon = Mwgs \times C \times \Delta t$$

Then the ECU 28 estimates the condensed water amount Mcon by adding the increase amount ΔMcon of the condensed water which is obtained at the present time of calculation to the condensed water amount Mcon which is calculated at the last previous time of calculation.

$$Mcon = Mcon + \Delta Mcon$$

The estimated condensed water amount Mcon is stored in the backup RAM of the ECU 28. At a time instant when the engine 11 is started again, the ECU 28 may estimate the condensed water amount Mcon by using the condensed water amount Mcon calculated at the time instant just before the engine 11 is stopped as one calculated at the last previous time of calculation, that is, as an initial value for the estimation. The condensed water amount Mcon calculated just before the engine 11 is an amount of the condensed water which remains in the exhaust pipe 25 while the engine 11 is kept stopped. The ECU 28 serves as a condensed water amount estimation means by executing the calculation for the condensed water amount Mcon based on the water production rate Mwgs, the exhaust gas temperature Tg and the external air temperature Ta.

The condensed water in the exhaust pipe 25 is discharged out of the exhaust pipe 25 by being blown by the exhaust air, when the amount of the inhaled air increases caused by an operation of a driver of the vehicle for accelerating the vehicle. In this case, the amount of the exhaust air in the exhaust pipe 25 increases accordingly.

The ECU 28 resets the condensed water amount Mcon to zero when the amount Mair of the air inhaled per a unit time becomes larger than a predetermined amount Mth. The ECU 28 may otherwise decrease the condensed water amount Mcon based on the increase of the amount Mair of the air inhaled per a unit time. Thus, the ECU 28 resets to zero or decreases the condensed water amount Mcon when the amount of the inhaled air increases and accordingly the amount of the exhaust air in the exhaust pipe 25 increases.

Hereafter, a detailed description will be given of processes in FIGS. 6 and 7 which are described in programs related to the estimation for the exhaust pipe temperature Tp.

[Determination of an Initial Value for the Exhaust Pipe Temperature]

Figure 6:
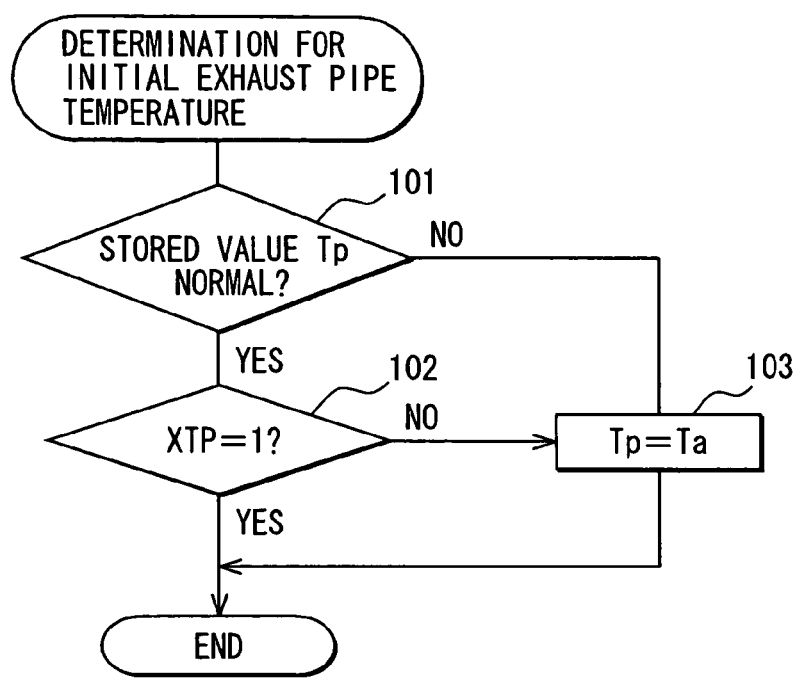
FIG. 6 is a flowchart showing a program for determining an initial temperature of the exhaust pipe.

An initial exhaust pipe temperature program shown in FIG. 6 is executed by the ECU 28 just once when the IG switch is turned on. In executing the initial exhaust pipe temperature program, the ECU 28 initially makes at step 101 a determination whether a value of the exhaust pipe temperature Tp stored in the backup RAM is normal. The determination at step 101 can be made, for example, according to whether the stored value of the exhaust pipe temperature Tp is within a predetermined normal range.

When the determination at step 101 is affirmative, the ECU 28 subsequently executes step 102 to make a determination whether an exhaust pipe temperature estimation flag XTP is set to unity, that is, whether the exhaust pipe temperature Tp has been already calculated. When the determination at step 102 is affirmative, the ECU 28 ends executing the initial exhaust pipe temperature program.

When the determination at step 101 or 102 is negative, the ECU 28 subsequently executes step 103 to set an initial value for the exhaust pipe temperature Tp to a value of the external air temperature Ta.

$$Tp=Ta$$

[Determination of the Exhaust Pipe Temperature]

Figure 7:
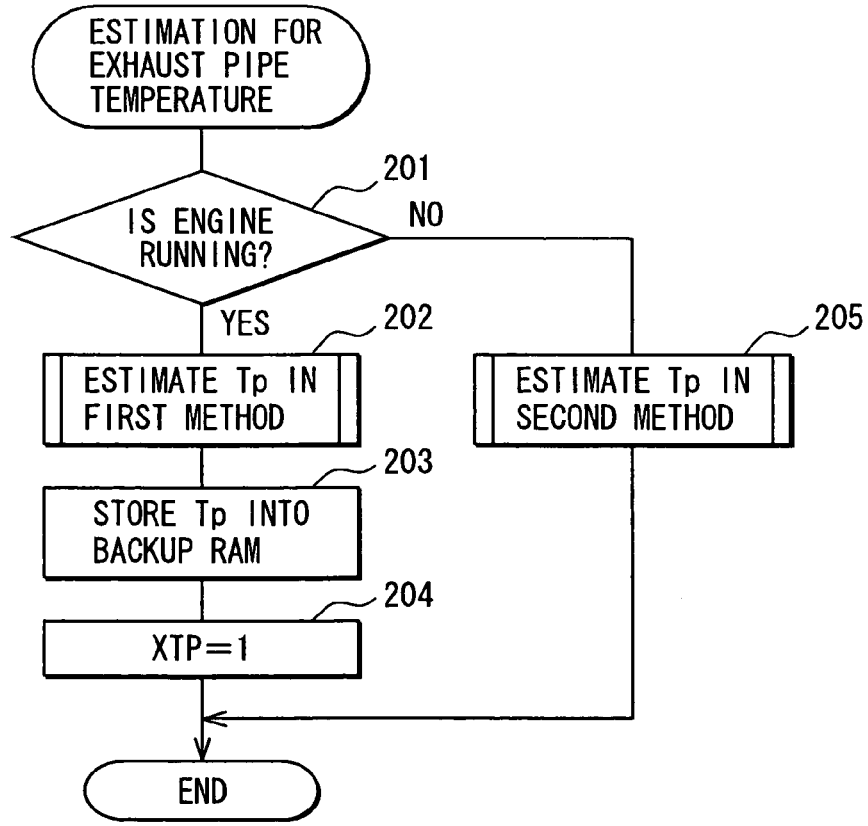
FIG. 7 is a flowchart showing a program for estimating the temperature of the exhaust pipe.

An exhaust pipe temperature estimation program in FIG. 7 is executed by the ECU 28 repeatedly every predetermined period $\Delta t$ while the ECU 28 is operating (that is, while the IG switch is on). The ECU 28 serves as an exhaust pipe temperature determination means by executing the exhaust pipe temperature estimation program. In executing the exhaust pipe temperature estimation program, the ECU 28 initially makes at step 201 a determination whether the engine 11 is running (being rotated). When the determination at step 201 is affirmative, the ECU 28 subsequently executes step 202 to estimate the exhaust pipe temperature Tp by using the first method described above. More specifically in the step 202, the ECU 28 calculates, based on the data map for the correction coefficient $\alpha$, the correction coefficient $\alpha$, which depends on the current rotation speed of the engine 11 and the current load of the engine 11 and further calculates the incoming heat transfer coefficient Kin by multiplying the initial incoming heat transfer coefficient Kin0 by the calculated correction coefficient $\alpha$.

$$Kin=Kin0\times\alpha$$

In step 202, the ECU 28 further calculates, based on the data map for the correction coefficient $\beta$, the correction coefficient $\beta$, which depends on the current rotational speed of the radiator fan and the current speed of the vehicle and furthermore calculates the outgoing heat transfer coefficient Kout by multiplying the initial outgoing heat transfer coefficient Kout0 by the calculated correction coefficient $\beta$.

$$Kout=Kout0\times\beta$$

Subsequently at step 202, the ECU 28 calculates the condensed water heat absorption Hcon, which is the amount of the heat transferred from the exhaust pipe 25 and the exhaust gas to the condensed water.

Subsequently at step 202, the ECU 28 multiplies by the incoming heat transfer coefficient Kin the difference (Tg−Tp) between the exhaust gas temperature Tg and the exhaust pipe temperature Tp, to obtain the amount {Kin×(Tg−Tp)} of the heat received per the calculation period $\Delta t$ by the exhaust pipe 25, which depends on the engine rotational speed and the engine load.

Subsequently at step 202, the ECU 28 multiplies by the outgoing heat transfer coefficient Kout the difference (Tp−Ta) between the exhaust pipe temperature Tp and the external air temperature Ta, to obtain the amount {Kout×(Tp−Ta)} of the heat released per the calculation period $\Delta t$ by the exhaust pipe 25, which depends on the rotational speed of the radiator fan and the speed of the vehicle.

Subsequently at step 202, the ECU 28 calculates the exhaust pipe temperature change amount $\Delta Tp$ of the change per the calculation period $\Delta t$ in the exhaust pipe temperature Tp based on the amount {Kin×(Tg−Tp)} of the heat received per the calculation period $\Delta t$ by the exhaust pipe 25, the amount {Kout×(Tp−Ta)} of the heat released per the calculation period $\Delta t$ by the exhaust pipe 25, the condensed water heat absorption Hcon, the heat capacity Cp of the exhaust pipe 25, and the calculation period $\Delta t$, according to the equation:

$$\Delta Tp=\{Kin\times(Tg-Tp)-Kout\times(Tp-Ta)-Hcon\}\times\Delta t/Cp$$

Subsequently at step 202, the ECU 28 calculates the exhaust pipe temperature Tp of the present time of calculation by adding the calculated exhaust pipe temperature change amount $\Delta Tp$ to the exhaust pipe temperature Tp of the last previous time of calculation. In other words, the ECU 28 calculates the exhaust pipe temperature Tp of the present time by repeatedly adding to an initial exhaust pipe temperature the calculated exhaust pipe temperature change amounts $\Delta Tp$ calculated until the present time of calculation.

$$Tp=Tp+\Delta Tp$$

At a time instant when the engine 11 is started again, the ECU 28 may estimate the exhaust pipe temperature Tp which is the same as the exhaust pipe temperature Tp which is estimated by the second method just before the engine 11 is started.

When the exhaust pipe temperature Tp is estimated as described above, the ECU 28 subsequently stores at step 203 the estimated exhaust pipe temperature Tp into the backup RAM and then sets at step 204 the exhaust pipe temperature estimation flag XTP in the backup RAM to unity.

When the determination at step 201 is negative, that is, when the engine is not running, the ECU 28 then executes step 205 to estimate the exhaust pipe temperature Tp in the second method described above. More specifically, as shown in FIG. 3, the ECU 28 calculates, by using the data map for the exhaust pipe temperature decrease ratio D, the exhaust pipe temperature decrease ratio D of the exhaust pipe temperature Tp, which depends on the current engine stop duration S. The ECU 28 subsequently multiplies, by the exhaust pipe temperature decrease ratio D, the difference (Tpz−Ta) between the temperature Tpz of the exhaust pipe 25 at the time instant just before the engine is stopped and the external air temperature Ta. The ECU 28 then adds the multiplied value to the external air temperature Ta to obtain the exhaust pipe temperature Tp.

$$Tp=(Tpz-Ta) \times D + Ta$$

As described above, the amount of the heat received by the exhaust pipe 25 is corrected based on the rotational speed of the engine 11 and the engine load which indirectly indicate, respectively, the speed of the flow of the exhaust gas and the density of the exhaust gas. It is therefore possible to calculate with a high degree of accuracy the amount of the heat received by the exhaust pipe 25, in response to a situation in which the amount of the heat transferred per a unit time from the exhaust gas to the exhaust pipe 25 changes in accordance with the speed of the flow of the exhaust gas and the density of the exhaust gas. The exhaust pipe temperature Tp is accordingly estimated with a high degree of accuracy based on the amount of the heat received by the exhaust pipe 25.

In addition, the amount of the heat released by the exhaust pipe 25 is corrected based on the rotational speed of the radiator fan and the speed of the vehicle both of which indirectly indicate the speed of the flow of the external air. It is therefore possible to calculate with a high degree of accuracy the amount of the heat released by the exhaust pipe 25, in response to a situation in which the amount of the heat released per a unit time from the exhaust pipe 25 to the external air changes in accordance with the speed of the flow of the external air. The exhaust pipe temperature Tp is accordingly estimated with a high degree of accuracy based on the amount of the heat released by the exhaust pipe 25.

In addition, when the engine 11 is not running, (more specifically, in the period from the time when the IG switch is turned on to the time when the engine 11 is started), the exhaust pipe temperature Tp is estimated based on the external air temperature Ta, the engine stop duration S and the temperature Tpz of the exhaust pipe 25 at a time instant just before the engine is stopped. When the engine 11 is running (more specifically, in the period from the time when the engine is started to the time when the IG switch is turned off), the exhaust pipe temperature Tp is calculated by adding in series the calculated exhaust pipe temperature change amounts ΔTp to the temperature Tpz which serves as the initial value for the exhaust pipe temperature Tp. It is therefore possible to estimate with a high degree of accuracy the exhaust pipe temperature Tp even after a time when the engine 11 is started again before the exhaust pipe temperature Tp decreases to the external air temperature Ta.

In addition, the exhaust pipe temperature Tp is estimated based on the amount of the heat received by the exhaust pipe 25, the amount of the heat released by the exhaust pipe 25 and the condensed water heat absorption Hcon which is calculated based on the amount of the condensed water generated in the exhaust pipe 25. It is therefore possible to estimate the exhaust pipe temperature Tp in response to the amount of the heat absorbed by the condensed water. Thus, the exhaust pipe temperature Tp is estimated with a more improved accuracy.

The present invention should not be limited to the embodiment discussed above and shown in the figures, but may be implemented in various ways without departing from the spirit of the invention.

For example, the speed of the flow of the exhaust gas may be estimated or detected. In this case, the ECU 28 may correct the amount of the heat received by the exhaust pipe 25 based on the estimated or detected speed of the flow of the exhaust gas.

The ECU 28 may calculate a division value Pg/Tg which is obtained by dividing a pressure Pg of the exhaust gas by a temperature Tg of the exhaust gas, and may correct the amount of the heat released by the exhaust pipe 25 based on the division value Pg/Tg which indirectly indicates the density ρg of the exhaust gas. As is understood by the gas state equation, the density ρg changes depending on the division value Pg/Tg. Therefore the division value Pg/Tg can be information indirectly indicating the density of the exhaust gas ρg.

As is also understood by the gas state equation, the density ρg changes depending on the pressure Pg and the temperature Tg of the exhaust gas.

According to the gas state equation, the density ρg, the pressure Pg and the temperature Tg of the exhaust gas have a relation described in the following equation (1):

$$Pg = \rho g \times R \times Tg \qquad (1),$$

wherein the value R is the gas constant.

From the equation (1), a relation described in the equation (2) below is obtained:

$$\rho g = (Pg/Tg) \times (1/R) \qquad (2).$$

The ECU 28 therefore may correct the amount of the heat released by the exhaust pipe 25 based on one of the pressure Pg and the temperature Tg of the exhaust gas. Thus, the one of the pressure Pg and the temperature Tg of the exhaust gas may be used as substitute information for the density of the exhaust gas. In this case, the ECU 28 does not have to serve as both of a means for detecting (otherwise estimating) the pressure of the exhaust gas and a means for detecting (otherwise estimating) the temperature of the exhaust gas.

While the engine 11 is idling, loss of pressure caused by the catalyst 27 located at the exhaust pipe 25 becomes ignorable and the pressure of the exhaust gas becomes almost equal to the pressure of the external air. The ECU 28 may therefore estimate the pressure of the exhaust gas to be as high as the pressure of the external air. The ECU 28 may also estimate or detect the density of the exhaust gas and correct the amount of the heat received by the exhaust pipe 25 based on the estimated or detected density of the exhaust gas.

The ECU 28 may determine the amount of the heat released by the exhaust pipe 25 based on only one of the rotational speed of the radiator fan and the speed of the vehicle. The ECU 28 may estimate or detect the speed of the flow of the external air and correct the amount of the heat released by the exhaust pipe 25 based on the estimated or detected speed of the flow of the external air.

The ECU 28 may calculate a division value Pa/Ta which is obtained by dividing a pressure Pa of the external air by a temperature Ta of the external air and may correct the amount of the heat released by the exhaust pipe 25 based on the calculated division value Pa/Ta. As is understood by the gas state equation, the density ρa of the external air changes depending on the division value Pa/Ta of the external air. The division value Pa/Ta can therefore be substitute information for the density ρa of the external air.

According to the gas state equation, the density ρa, the pressure Pa and the temperature Ta of the external air have a relation described in the following equation (3):

$$Pa = \rho a \times R \times Ta \quad (3)$$

wherein the value R is the gas constant.

From the equation (3), a relation described in the equation (4) below is obtained:

$$\rho a = (Pa/Ta) \times (1/R) \quad (4).$$

As is also understood by the gas state equation, the density ρa of the external air changes depending on the pressure Pa and the temperature Ta of the external air. The division value Pa/Ta can therefore be substitute information for the density ρa of the external air. The ECU 28 therefore may correct the amount of the heat released by the exhaust pipe 25 based on one of the pressure Pa and the temperature Ta of the external air. Thus, the one of the pressure Pa and the temperature Ta of the external air may be used as substitute information for the density of the external air. In this case, the ECU 28 does not have to serve as both of a means for detecting (otherwise estimating) the pressure of the external air and a means for detecting (otherwise estimating) the temperature of the external air. In this case, a temperature of inhaled air may be used in place of the temperature of the external air, because the temperature of the inhaled air changes depending on the temperature of the external air.

The ECU 28 may estimate or detect the density of the external air and correct the amount of the heat released by the exhaust pipe 25 based on the estimated or detected density of the external air.

What is claimed is:

1. A device for estimating a temperature of an exhaust pipe of an internal combustion engine, comprising:
   a first obtaining means for obtaining a first heat amount that the exhaust pipe receives from exhaust gas of the internal combustion engine per unit time;
   a second obtaining means for obtaining a second heat amount that the exhaust pipe releases to external air per the unit time; and
   a temperature estimation means for estimating the temperature of the exhaust pipe based on the obtained first amount and the obtained second amount,
   wherein the first obtaining means obtains the first amount based on a exhaust gas speed related value relating to a flow speed of the exhaust gas.

2. The device according to claim 1, wherein the first obtaining means uses a rotational speed of the internal combustion engine as the exhaust gas speed related value.

3. The device according to claim 1, wherein the first obtaining means obtains the first amount by multiplying a heat transfer coefficient between the exhaust gas and the exhaust pipe and a difference in temperature between the exhaust gas and the exhaust pipe.

4. The device according to claim 1, wherein the second obtaining means obtains the second amount by multiplying a heat transfer coefficient between the exhaust pipe and the external air and a difference in temperature between the exhaust pipe and the external air.

5. The device according to claim 1, wherein the second obtaining means obtains the second amount based on an external air speed value related to a speed of a flow of the external air.

6. The device according to claim 5, wherein the second obtaining means uses, as the external air speed related value, one of a rotational speed of a radiator fan of the internal combustion engine and a speed of a vehicle to which the internal combustion engine is installed.

7. The device according to claim 1, wherein the second obtaining means obtains the second amount based on an external gas density related value related to a density of the external air.

8. The device according to claim 7, wherein the second obtaining means uses, as the external air density related value, a division value which is obtained by dividing a pressure of the external air by a temperature of the external air.

9. The device according to claim 7, wherein the second obtaining means uses, as the external air density related value, a pressure of the external air.

10. The device according to claim 7, wherein the second obtaining means uses, as the external air density related value, one of a temperature of the external air and a temperature of intake air of the internal combustion engine.

11. A device for estimating a temperature of an exhaust pipe of an internal combustion engine having an exhaust pipe, comprising:
    a first obtaining means for obtaining a first heat amount that the exhaust pipe receives from exhaust gas of the internal combustion engine per unit time;
    a second obtaining means for obtaining a second heat amount that the exhaust pipe releases to external air per the unit time; and
    a temperature estimation means for estimating the temperature of the exhaust pipe based on the obtained first amount and the obtained second amount,
    wherein the first obtaining means obtains the first amount based on an exhaust gas density related value relating to a density of the exhaust gas.

12. The device according to claim 11, wherein the first obtaining means uses, as the exhaust gas density related value, a pressure of the exhaust gas.

13. The device according to claim 11, wherein the first obtaining means uses, as the exhaust gas density related value, a temperature of the exhaust gas.

14. The device according to claim 11, wherein the first obtaining means uses, as the exhaust gas density related value, a division value which is obtained by dividing a pressure of the exhaust gas by a temperature of the exhaust gas.

15. The device according to claim 14, wherein the first obtaining means uses, as the pressure of the exhaust gas, a pressure of the external air.

16. The device according to claim 11, wherein the first obtaining means uses, as the exhaust gas density related value, a load on the internal combustion engine.

17. The device according to claim 16, wherein the first obtaining means uses, as the load, one of a pressure on an intake pipe of the internal combustion engine and an amount of air in a cylinder of the internal combustion engine.

18. A device for estimating a temperature of an exhaust pipe of an internal combustion engine having an exhaust pipe, comprising:
    a first obtaining means for repeatedly obtaining a first heat amount that the exhaust pipe receives from exhaust gas of the internal combustion engine per unit time;

a second obtaining means for repeatedly obtaining a second heat amount that the exhaust pipe releases to external air per the unit time; and a temperature estimation means for repeatedly estimating the temperature of the exhaust pipe, by estimating, based on the obtained first amount and the obtained second amount, a change of the temperature of the exhaust pipe per the unit time and by adding in series the change to an initial value for the temperature of the exhaust pipe, wherein the temperature estimation means uses, as the initial value, an estimated value for the temperature of the exhaust pipe in starting the engine, the estimated value being estimated based on a temperature of the external air, another estimated value for the temperature of the exhaust pipe and a duration within which the internal combustion engine is kept stopped, the another estimated value being estimated before the internal combustion engine lastly stops.

19. A device for estimating a temperature of an exhaust pipe of an internal combustion engine having an exhaust pipe, comprising:

a first obtaining means for obtaining a first heat amount that the exhaust pipe receives from exhaust gas of the internal combustion engine per unit time;

a second obtaining means for obtaining a second heat amount that the exhaust pipe releases to external air per the unit time; and a third obtaining means for obtaining a third amount of condensed water generated in the exhaust pipe;

a fourth obtaining means for obtaining, based on the obtained third amount, a fourth amount of heat that the condensed water receives; and a temperature estimation means for estimating the temperature of the exhaust pipe based on the obtained first amount, the obtained second amount and the obtained fourth amount.

20. The device according to claim 19, wherein the third obtaining means calculates, based on an amount of air inhaled to the internal combustion engine and an amount of the fuel injected in the internal combustion engine, an amount of water vapor produced through combustion reaction of the injected fuel and the inhaled air, and the third obtaining means estimates the third amount based on the calculated amount of the water vapor, a temperature of the exhaust gas and another temperature of the exhaust pipe.

21. A method for estimating a temperature of an exhaust pipe of an internal combustion engine having an exhaust pipe, comprising:

obtaining a first heat amount that the exhaust pipe receives from exhaust gas of the internal combustion engine per unit time;

obtaining a second heat amount that the exhaust pipe release to external air per the unit time; and estimating the temperature of the exhaust pipe based on the obtained first amount and the obtained second amount, wherein the first amount is obtained based on a exhaust gas speed related value related to a speed of a flow of the exhaust gas.

22. A method for estimating a temperature of an exhaust pipe of an internal combustion engine having an exhaust pipe, comprising:

obtaining a first heat amount that the exhaust pipe receives from exhaust gas of the internal combustion engine per unit time;

obtaining a second heat amount that the exhaust pipe releases to external air per the unit time; and estimating the temperature of the exhaust pipe based on the obtained first amount and the obtained second amount, wherein the first amount is obtained based on an exhaust gas density related value related to a density of the exhaust gas.

23. A method for estimating a temperature of an exhaust pipe of an internal combustion engine having an exhaust pipe, comprising:

repeatedly obtaining a first heat amount that the exhaust pipe receives from exhaust gas of the internal combustion engine per unit time;

repeatedly obtaining a second heat amount that the exhaust pipe releases to external air per the unit time; and repeatedly estimating the temperature of the exhaust pipe, by estimating, based on the obtained first amount and the obtained second amount, a change of the temperature of the exhaust pipe per the unit time and by adding in series the change to an initial value for the temperature of the exhaust pipe, wherein an estimated value for the temperature of the exhaust pipe in starting the engine is used as the initial value, the estimated value being estimated based on a temperature of the external air, another estimated value for the temperature of the exhaust pipe and a duration within which the internal combustion engine is kept stopped, the another estimated value being estimated before the internal combustion engine lastly stops.

24. A method for estimating a temperature of an exhaust pipe of an internal combustion engine having an exhaust pipe, comprising:

obtaining a first heat amount that the exhaust pipe receives from exhaust gas of the internal combustion engine per unit time;

obtaining a second heat amount that the exhaust pipe releases to external air per the unit time;

obtaining a third amount of condensed water generated in the exhaust pipe;

obtaining, based on the obtained third amount, a fourth amount of heat that the condensed water receives; and estimating the temperature of the exhaust pipe based on the obtained first amount, the obtained second amount and the obtained fourth amount.

* * * * *